United States Patent
Lee et al.

(10) Patent No.: US 9,150,717 B2
(45) Date of Patent: *Oct. 6, 2015

(54) CONTROLLED RHEOLOGY FORMULATIONS CONTAINING HIGH MELT STRENGTH POLYPROPYLENE FOR EXTRUSION COATING

(71) Applicant: Equistar Chemicals, LP, Houston, TX (US)

(72) Inventors: Chun Lee, Cincinnati, OH (US); Dinshong Dong, Hockessin (DE); Charles S. Holland, Springboro, OH (US); James R. Beren, West Chester, PA (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,237

(22) Filed: Oct. 2, 2013

(65) Prior Publication Data

US 2014/0031462 A1  Jan. 30, 2014

Related U.S. Application Data

(63) Continuation of application No. 13/024,015, filed on Feb. 9, 2011, now Pat. No. 8,575,252.

(51) Int. Cl.
| | | |
|---|---|---|
| *C08K 5/00* | (2006.01) | |
| *C08K 5/34* | (2006.01) | |
| *C08L 23/12* | (2006.01) | |
| *C08L 23/10* | (2006.01) | |
| *C08K 5/526* | (2006.01) | |

(52) U.S. Cl.
CPC ............... *C08L 23/12* (2013.01); *C08L 23/10* (2013.01); *C08K 5/005* (2013.01); *C08K 5/526* (2013.01); *C08L 2207/02* (2013.01)

(58) Field of Classification Search
USPC .......................................................... 524/236
See application file for complete search history.

(56) References Cited

U.S. PATENT DOCUMENTS

| | | | |
|---|---|---|---|
| 5,266,607 A | 11/1993 | Lucas et al. | |
| 5,439,949 A | 8/1995 | Lucas et al. | |
| 5,508,318 A * | 4/1996 | Comer | ......................... 522/112 |
| 5,731,362 A | 3/1998 | Scheve et al. | |
| 2002/0086924 A1 | 7/2002 | King | |
| 2004/0102550 A1* | 5/2004 | Dang et al. | ..................... 524/115 |
| 2010/0168267 A1 | 7/2010 | Dang et al. | |

FOREIGN PATENT DOCUMENTS

EP        0634454 A1     1/1995

OTHER PUBLICATIONS

PCT International Search Report and the Written Opinion—Mailed May 16, 2012 for Corresponding PCT/US2012/024487.

* cited by examiner

*Primary Examiner* — Hui Chin

(57) ABSTRACT

A process of extruding a blend of an irradiated first propylene polymer and a non-irradiated second propylene polymer, where the first propylene polymer comprises a non-phenolic stabilizer. The irradiation of the first propylene polymer extrudate is conducted in a reduced oxygen environment, and the irradiated first propylene polymer and the non-irradiated second propylene polymer are blended at a temperature below their respective melting points. The blend has a viscosity retention of 20 to 35%.

5 Claims, No Drawings

CONTROLLED RHEOLOGY FORMULATIONS CONTAINING HIGH MELT STRENGTH POLYPROPYLENE FOR EXTRUSION COATING

This continuation application claims benefit of priority under 35 U.S.C. §120 of pending U.S. application Ser. No. 13/024,015, filed Feb. 9, 2011, the contents of which are incorporated herein by reference in its entirety.

FIELD OF THE INVENTION

The present invention relates to a composition for improved extrusion processes. More particularly, the present invention relates to a blend of irradiated extrudates of polypropylene and non-irradiated polypropylene having particular rheologoical properties for use in extrusion processes.

BACKGROUND OF THE INVENTION

The use of low density polyethylene in extrusion coating onto substrates such as paper and metal foils has historically been favored over that of polypropylene. This is a result of the relative poor extrusion coating characteristics of conventional polypropylenes at high throughput rates, where extension of the polymer melt through the extruder die increases. Conventional polypropylenes don't well-tolerate the higher extension, which adversely affects the orientation of the polymer melt, as evidenced by neck-in, draw resonance, edge weave and poor film quality.

Stabilizing additives are typically added to propylene polymer compositions to protect against degradation due to oxidation involving heat, UV radiation, ionizing radiation and transition metal impurities. In particular, in extrusion coating, fouling of the die or nip roll due to degradation products can occur if an appropriate level of stabilization is not present, potentially resulting in a shutdown of the extrusion coating product line. This is particularly important at higher extrusion temperatures. In addition to unit downtime, degradation can result in color development, undesirable taste or odor in the resulting polypropylene. Finally, appropriate stabilization levels are important to prevent large melt flow shifts at the operating temperature and residence time of the extruder, and to reduce the sensitivity of the extrusion coating operation to changes in operating conditions, e.g., extruder temperature, screw rpm, backpressure at the die, etc. Additives to inhibit degradation include free radical traps, the so-called primary antioxidants, and peroxide decomposers, sometimes referred to as secondary antioxidants. Hindered phenols and hindered amines are typical free-radical traps. Phosphites and thioesters are examples of peroxide decomposers. Phosphites are effective in the melt phase, and are used to prevent color generation. Thioesters are used for thermal stabilization to control undesirable taste and odor development in the resulting polypropylene. They are effective in the solid phase.

Increasing the melt strength of the polypropylene is known to improve melt orientation. Techniques to improve melt strength in polypropylene have included irradiation of conventional flake polypropylene in reduced-oxygen environments, as described, for example, in U.S. Pat. Nos. 4,916,198, 5,047,485, 5,414,027, 5,541,236, 5,554,668, 5,591,785, 5,731,362, and 5,804,304. For example, U.S. Pat. No. 5,508,318 discloses compounded blends of irradiated and non-irradiated olefin polymer materials suitable for extrusion coating applications requiring low gloss. These irradiation methods increase propylene polymer melt strength by creating polymer radicals during irradiation which then re-combine to form long-chain branches in the reduced oxygen environment. Conventionally, phenolic antioxidants have long been used to improve polymer stability under elevated temperature conditions, such as those typically experienced during extrusion, or during extended periods of storage. However, their use in irradiated compositions undermines enhanced melt strength by scavenging free radicals, thereby reducing the number of polymeric free radicals available to recombine to form long-chain branches. Moreover, irradiation of phenolic antioxidant-containing polymers can result in the formation of degradation products that impart undesirable color. Non-phenolic stabilizers have been used in the irradiation of conventional polyolefin materials to avoid such problems, as described in U.S. Pat. No. 6,664,317. International Publication No. WO 2009/003930 discloses irradiation of high melt strength polypropylene in the form of pellets containing non-phenolic antioxidants. However, a continuing need exists for extrusion coating processes that provide good film quality at high line speeds.

SUMMARY OF THE INVENTION

The present disclosure relates to a composition made up of a blend of an irradiated first propylene polymer having a non-phenolic stabilizer and a non-irradiated second propylene polymer. The irradiation of the first propylene polymer was conducted in a reduced oxygen environment, and the irradiated first propylene polymer and the non-irradiated second propylene polymer were blended at a temperature below the melting point of the first and second propylene polymers, wherein the blend has a viscosity retention (defined below) of 20 to 35%.

In further embodiments, the present disclosure relates to a process of extruding a blend of an irradiated first propylene polymer and a non-irradiated second propylene polymer, where the first propylene polymer comprises a non-phenolic stabilizer. The irradiation of the first propylene polymer is conducted in a reduced oxygen environment, and the irradiated first propylene polymer and the non-irradiated second propylene polymer are blended at a temperature below their respective melting points. The blend has a viscosity retention of 20 to 35%.

In other embodiments the present disclosure relates to a process of blending an irradiated first propylene polymer comprising a non-phenolic stabilizer, and a non-irradiated second propylene polymer, at a temperature below the melting point of the first and second propylene polymers, thereby forming a polymer blend. The irradiation of the first propylene polymer was conducted in a reduced oxygen environment. The process further includes extruding the polymer blend to form a film and coating the film onto a substrate selected from paper, paperboard, fabrics or metal foils. The polymer blend has a viscosity retention of 20 to 35%.

In additional embodiments, the present disclosure relates to a process for preparing a polymer composition including blending an irradiated first propylene polymer having a non-phenolic stabilizer with a non-irradiated second propylene polymer, wherein the irradiation of the first propylene polymer was conducted in a reduced oxygen environment. Further, the irradiated first propylene polymer and the non-irradiated second propylene polymer were blended at a temperature below the melting point of the first and second propylene polymers. The blend has a viscosity retention of 20 to 35%.

DETAILED DESCRIPTION OF THE INVENTION

Propylene Polymer Compositions

The first propylene polymer includes a non-phenolic stabilizer and a propylene polymer selected from:
(a) a crystalline propylene homopolymer having a xylene insolubles greater than 80%, preferably greater than 85%,
(b) a crystalline random copolymer comprising propylene and an olefin selected from the group consisting of ethylene and a $C_4$-$C_{10}$ α-olefin, having xylene insolubles greater than 80%, preferably greater than 82%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
(c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight; and
(d) mixtures thereof.

The second propylene polymer is selected from propylene polymers (a) through (d) as described above for the first propylene polymer, and can be the same or different from the first propylene polymer.

Preferably, the first and second propylene polymers are independently selected from a crystalline propylene homopolymer, a crystalline random copolymer of propylene and an olefin selected from the group consisting of ethylene and $C_4$-$C_{10}$ α-olefins or mixtures thereof. More preferably, the first propylene polymer is a crystalline propylene homopolymer or a crystalline copolymer of propylene and ethylene. Most preferably, the first propylene polymer is a crystalline propylene homopolymer.

The first propylene polymer preferably has a melt flow rate of 0.1 to 100 dg/min, more preferably 0.15 to 30 dg/min, most preferably 0.2 to 15 dg/min. The second propylene polymer preferably has a melt flow rate of 0.1 to 100 dg/min, more preferably 0.5 to 50 dg/min, most preferably 1 to 35 dg/min. Melt flow rate is determined according to ASTM D 1238, measured at 230° C., 2.16 kg, units of dg/min.

The blend of the irradiated extrudate of the first propylene polymer and the non-irradiated second propylene polymer preferably contains 5 to 95 wt % of the irradiated extrudate of the first propylene polymer and 5 to 95 wt % of the non-irradiated second propylene polymer. More preferably, the blend contains 10 to 30 wt % of the irradiated extrudate of the first propylene polymer and 70 to 90 wt % of the non-irradiated second propylene polymer.

The first and second propylene polymers can be prepared by Ziegler-Natta or Single-Site (e.g. metallocene) catalysis.

Non-Phenolic Stabilizers

The non-phenolic stabilizers in the first propylene polymer are selected from hindered amines, hydroxylamines, nitrones, amine oxides, benzofuranones, organic phosphites, phosphonites or mixtures thereof. Non-phenolic stabilizers are described in for example, International Publication No. WO 2009/003930. Preferably, the non-phenolic stabilizers are selected from hindered amines, hydroxylamines, phosphites or mixtures thereof. The non phenolic stabilizers are typically present in an amount ranging from about 0.001 to about 1 pph, preferably from about 0.005 to about 0.5 pph, and more preferably from about 0.01 to about 0.2 pph.

Processes for Producing the Irradiated Polymer Extrudates

The first propylene polymer to be extruded and irradiated according to the present invention can be produced by a variety of processes, e.g., by combining the propylene polymer and the non-phenolic stabilizer via melt blending, blending below their respective melting points (dry blending), or combinations thereof. Preferably, the first propylene polymer is formed by first dry blending the propylene polymer with the non-phenolic stabilizer, and then extruding the blended material above its melting point. The extrudate produced in the extruder is then subjected to an irradiation treatment. During irradiation, the extrudate can be in the form of a solid, semi-solid or melt. Preferably, the extrudate is a solid, more preferably, the extrudate is in the form of a pellet. Alternative to extruding, the first propylene polymer may be formed into particles, flakes or other forms by casting or other processes known in the art. However, preferably, the first propylene polymer is an extrudate.

The first propylene polymer is irradiated in a reduced oxygen environment, where the total radiation dosage is preferably about 1 to about 20 Megarad, more preferably 2 to 15 Megarad, most preferably 3 to 12 Megarad. The reduced oxygen environment is maintained during irradiation to prevent chain-scission reactions.

The expression "active oxygen" throughout this disclosure refers to oxygen in a form that will react with the propylene polymer composition, and more particularly with free radicals present in the propylene polymer composition, which are produced from the irradiation process. Active oxygen can include, but is not limited to, molecular oxygen, which is the form of oxygen normally found in air.

The expression "reduced oxygen environment" throughout this disclosure means an active oxygen concentration less than about 15% by volume, preferably less than 5% by volume, and more preferably less than 0.004% by volume, with respect to a total volume of the reduced oxygen environment. Most preferably, the reduced oxygen environment is an inert gas selected from nitrogen, argon, helium and krypton. Typically, the reduced oxygen environment is achieved by replacing part or all of the air in the environment in which the irradiation treatment is conducted by an inert gas, either under vacuum or at positive pressures.

The term "rad" is usually defined as a quantity of ionizing radiation that results in an absorption of 100 ergs of energy per gram of irradiated material, regardless of the source of radiation. With regard to the present invention, the amount of energy absorbed by the propylene polymer composition when it is irradiated usually is not determined. However, the process can be carried out such that the energy absorption from the ionizing radiation can be measured by a conventional dosimeter, which is a measuring device comprising a strip of fabric, film, or combination thereof, wherein the strip of fabric, film, or combination thereof comprises a radiation sensitive dye. This radiation-sensitive dye can be used as an energy absorption sensing means. Accordingly, as used throughout this disclosure, the term "rad" means a quantity of ionizing radiation resulting in an absorption of the equivalent of 100 ergs of energy per gram of fabric, film, or combination thereof comprising the radiation sensitive dye of the dosimeter placed at a surface of the propylene polymer composition being irradiated, regardless of the form of the intermediate polyolefin resin at the time of irradiation.

The radiation from the irradiation treatment can be gamma radiation or electron beam radiation, with the radiation preferably being electron beam radiation. Radiation dosage and dosage rates are adjusted to form a substantial amount of chain scission within the propylene polymer composition, so as to achieve a desired change in melt strength while remaining below the gelation point. Typically, the propylene polymer composition is exposed to the requisite dosage of radiation for a time period ranging from about 0.0001 seconds to several days, the period of exposure being based on the desired total radiation dose, radiation dosage rate, and the type of radiation being used. Radiation dosage rates are typically about 1 megarad to about 10,000 megarad per minute, preferably about 18 to about 2,000 megarads per minute.

The radiation should have sufficient energy to penetrate, to the extent desired, the extrudate of the propylene polymer composition, and preferably to excite the atomic structure of the propylene polymer composition, but preferably not sufficient energy to affect atomic nuclei within the intermediate polyolefin composition. Typically, the radiation is formed from electrons being beamed from an electron generator comprising an accelerating potential of 500-10,000 kilovolts.

After the extrudate of the first propylene polymer has been irradiated, it is maintained in the reduced oxygen environment at temperatures of from 20° C. to 110° C. for a period of time sufficient for a significant amount of long chain branches to form within the irradiated first propylene polymer. A minimum amount of time is needed for sufficient migration of the propylene resin chain fragments formed by the irradiation to free radical sites, where they can re-form to complete chains or otherwise form long branches on the polymer chains. Preferably, the irradiated first propylene polymer is maintained in the reduced oxygen environment after exposure to the radiation for about one minute to up to about 48 hours, more preferably, for about one minute to about 24 hours, most preferably 90 minutes to 20 hours.

Following the irradiation treatment, the irradiated extrudate of the first propylene polymer can be subjected to a quenching step while it is in the reduced oxygen environment, to deactivate substantially all free radicals remaining in the irradiated propylene polymer composition. The quenching step includes raising the temperature of the irradiated extrudate of the first propylene polymer, while in the reduced oxygen environment, to temperatures ranging from about 20° C. to about 200° C., more preferably from about 100° C. to about 150° C. Conventional free radical traps, such as methyl mercaptan, can optionally be used during the quenching step.

The irradiation step results in an increase in the melt tension of the irradiated first propylene polymer. Preferably, the melt tension of the irradiated extrudate of the first propylene polymer is greater than 0.5 cN, preferably greater than 1 cN, more preferably, 3.5 to 40 cN, most preferably 20 to 35 cN.

Process for Blending the Irradiated Extrudate and Non-Irradiated Polymer.

The irradiated extrudate of the first propylene polymer is blended with the non-irradiated second propylene polymer below the melting points of both components. Preferably, the blending is performed at room temperature. Blending is conducted in mixing equipment well-known to those skilled in the art, such as a tumble blender, ribbon blender, henschel blender, or by co-feeding irradiated extrudate through loss-in-weight (or gravimetric) feeders at the extruder. In this way, suitable dispersion of the high melt strength material into the non-irradiated material can be obtained without compounding the blend components. Preferably, the blending is conducted by co-feeding irradiated extrudate through loss-in-weight (or gravimetric) feeders at the extruder.

Additives, Stabilizers, and Fillers

The irradiated extrudate of the first propylene polymer can further comprise, in addition to the non-phenolic stabilizer, conventional additives and stabilizers well known in the art. In this regard, the irradiated first propylene polymer can additionally comprise at least one additive, stabilizer, filler, or combination thereof. It will be understood by those in the art that additives is a broad term that encompasses stabilizers and fillers. Additives, stabilizers, and fillers can include, but are not limited to, UV absorbers, metal deactivators, peroxide scavengers, basic co-stabilizers, acid scavengers, pigments, catalysts, optical brighteners, antistatic agents, and mixtures thereof, which can be added in amounts well known to those skilled in the art. However, any additives, stabilizers, fillers, or the like, added to the first propylene polymer should not substantially negatively affect the improved melt tension of the irradiated first propylene polymer described in the present invention. In particular, the total amount of any phenolic stabilizers present in the irradiated extrudate of the first propylene polymer is at most 500 ppm based on the polymer, more preferably less than 150 ppm, more preferably less than 100 ppm, and more preferably less than 50 ppm. Most preferably, the irradiated extrudate of the first propylene polymer is free of phenolic stabilizers.

The non-irradiated second propylene polymer can comprise conventional stabilizers and additives well known in the art, in amounts consistent with maintaining the viscosity retention of the blend of the irradiated extrudate of the first propylene polymer and the non-irradiated second propylene polymer within the desired range. Preferably, the non-irradiated second propylene polymer contains stabilizers selected from hindered phenols, phospites, thioesters, and mixtures thereof, more preferably, selected from hindered phenols. The stabilizers are preferably present in an amount from 0.02 to 0.15 pph, more preferably, from 0.04 to 0.12 pph.

Rheological Properties of Blend

The viscosity of polymer compositions can affect all aspects of the extrusion coating process: line speed, process stability, and film quality. Such viscosities are dependent not just on the nature of the polymers in the polymer composition, but also on the temperature of the extrusion coating process. The type and level of polymer stabilizers also affect the viscosity of the polymer composition, particularly at high extrusion coating temperatures, since they affect the polymers viscosity as a function of temperature. Polymer systems that perform well at lower extrusion coating temperatures may not perform well at higher temperatures. It has unexpectedly been found that viscosity retention values from 20 to 35%, as defined below, provide improved extrusion coating performance in terms of film quality and line speed. Preferably, the viscosity retention value is from 22 to 32%. When the viscosity retention is too low, stability problems can be encountered because the process becomes less capable of tolerating changes in operating conditions. When the viscosity retention is too high, rheological stability problems, such as draw resonance, can be encountered for thin films at high line speed.

Extrusion Coating Process

The extrusion coating process of the invention using the blend of the irradiated extrudate of the first propylene polymer and the non-irradiated second propylene polymer is preferably conducted at a die temperature of 550 F to 620 F, more preferably 560 F to 600 F, most preferably 575 F to 595 F; a die opening of 20 mils to 35 mils, more preferably 22 mils to 28 mils; an air gap of 5 inches to 12 inches, more preferably, 6 inches to 10 inches; and at a coating thickness of 0.3 mils to 1.5 mils, more preferably 0.5 mils to 1.0 mils. Line speeds for the extrusion coating process are preferably 800 feet per minute to 2500 feet per minute, more preferably 1200 feet per minute to 2000 feet per minute. The types of rolls used in the extrusion coating process are preferably textured or polished. More preferably, the type of rolls used is textured.

Test Methods

Unless otherwise specified, the properties of the polymer materials and compositions that are set forth in the following examples have been determined according to the following test methods:

Viscosity Retention

A polymer composition containing 85 wt % of the non-irradiated propylene polymer and 15 wt % of the irradiated extrudate of a propylene polymer were extruded with a Haake 1.25 inch single screw extruder with 1/8" strand die opening at 20 RPM. Two different temperature conditions were used:

Condition 1: Zone 1=180° C./Zone 2=190° C./Zone 3=190° C./die=190° C.,

Condition 2: Zone 1=280° C./Zone 2=290° C./Zone 3=300° C./die=310° C.

The complex viscosity of the extrudates collected at the two different temperatures was measured at 190° C. and 1 rad/sec frequency. Viscosity retention is defined as the complex viscosity ratio of extrudate condition 2 over extrudate condition 1 times 100 or $$\text{Viscosity Retention} = [(\eta^*_{condition\ 2})/(\eta^*_{condition\ 1})] \times 100$$

Melt Flow Rate ("MFR")

ASTM 131238, measured at 230° C., 2.16 kg, units of dg/min.

Film Quality

Film quality is measured by visually evaluating the films relative to the following criteria:

"Poor:" Film has sand paper texture, non-uniform appearance and numerous gels.

"Fair:" Film is smooth, with some areas of non-uniform appearance, and with some gels present.

"Good:" Film is smooth, with uniform appearance and few gels.

"Excellent:" Film is smooth, with uniform appearance and no visual gels present.

Melt Tension ("MT")

Melt tension is measured on a Goettfert Rheotens apparatus at 200° C. The Rheoten apparatus consists of two counter-rotating wheels mounted on a balance beam. A melt strand of the polymer is extruded from a capillary die and pulled between the counter-rotating wheels until the strand ruptures. The pulling velocity of the counter-rotating wheels is initially constant to establish a baseline of force, with a constant acceleration then applied to the strand until the strand ruptures. The maximum force measured before rupture during the test is taken as the melt tension. The extensibility of the melt is represented by the velocity at rupture.

Xylene Insolubles ("XI")

The weight percent of polymer soluble in xylene at room temperature is determined by placing 2.5 g of polymer in 250 ml of xylene at room temperature in a vessel equipped with a stirrer, and heating at 135° C. with agitation for 20 minutes to dissolve the whole polymer. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached.

Components

The following components are used in the Examples disclosed herewith:

Pro-fax® 6323 is a non-irradiated polypropylene homopolymer commercially available from Equistar Chemicals, LP.

Pro-fax® 6331 is a non-irradiated polypropylene homopolymer commercially available from Equistar Chemicals, LP.

Irganox 1330 is a sterically hindered phenolic antioxidant ("3,3',3',5,5',5'-hexa-tert-butyl-a,a',a'-(mesitylene-2,4,6-triyl)tri-p-cresol") commercially available from BASF.

Irgafos 168 is a phosphite based stabilizer ("Tris(2,4-di-tert-butylphenyl)phosphate").

Irganox 1010 is a Sterically hindered phenolic antioxidant ("Pentaerythritol Tetrakis(3-(3,5-di-tert-butyl-4-hydroxyphenyl)propionate)") commercially available from BASF.

Chimassorb 944 is a hindered amine stabilizer commercially available from BASF.

Irgastab FS042 is a hindered amine stabilizer commercially available from BASF.

Tinuvin 622 is a hindered amine stabilizer commercially available from BASF.

DHT-4A is a stabilizer comprised of Hydrotalcite available from Kyowa chemical industry.

EXAMPLES

The following examples are illustrative of preferred processes and are not intended to be limitations thereon. All references to parts, percentages and ratios in this specification refer to percentages by weight of the final composition prepared, and unless otherwise indicated, all totals equal 100% by weight.

Example 1

An extension-coated film was prepared from a polymer composition containing 85 wt % of a non-irradiated propylene polymer and 15 wt % of an irradiated extrudate of a propylene polymer. The non-irradiated propylene polymer is a propylene homopolymer having an MFR of 20 dg/min and XI of 97.8 wt %, and containing an additive package of 0.07 pph of Irganox 1330 and 0.05 pph of DHT-4A. The irradiated extrudate was prepared from a propylene homopolymer having an MFR of 0.14 dg/min and XI of 97.8 wt % compounded with 0.1 pph of Chimassorb 944, and 0.03 pph of calcium stearate, on a JSW extruder to form an extrudate with a melt flow rate of 0.6 dg/min. The extrudate was irradiated in an inert atmosphere, and then thermally treated at 80° C. for 1.5 hours and at 140° C. for an additional 1.5 hrs. The melt tension of the irradiated extrudate was 34 cN and the MFR was 1.7 dg/min.

The polymer composition was formed by dry blending the irradiated and non-irradiated materials below their melting point in a drum blender. The viscosity retention of the composition was then measured. The polymer composition was extrusion-coated onto 4-mil Craft paper using a 4.5-inch, 24:1 L/D, 150 horsepower Beloit single screw extruder with a coat hanger type die at a web width of 30 inches. Conditions for the extrusion coating process: air gap, die temperature, roll type, maximum line speed, and coating thickness, as well as the film properties are summarized in Table 1.

Example 2

An extrusion-coated film was prepared as in Example 1 except that the non-irradiated propylene polymer is a propylene homopolymer having an MFR of 18 dg/min and XI of 97.8 wt %, and containing an additive package of 0.08 pph Irganox 168, 0.04 pph of Irgastab FS042, and 0.04 pph of Tinuvin 622, all commercially available from BASF, and 0.05 pph of calcium stearate. The viscosity retention of the composition, as well as extrusion conditions and film properties, are summarized in Table 1.

Example 3

An extrusion-coated film was prepared as in Example 1 except that the non-irradiated propylene polymer is Pro-fax® 6323, a non-irradiated propylene homopolymer having an MFR of 12 dg/min, and an XI of 95 wt % and containing 0.056 pph of Irganox 1010, 0.056 pph of Irganox 168, and 0.225 pph of distearyl thiodipropionate, commercially available from Reagens USA, Inc. The viscosity retention of the composition, as well as extrusion conditions and film properties, are summarized in Table 1.

Example 4

An extrusion-coated film was prepared as in Example 1 except that the non-irradiated propylene polymer is Pro-fax® 6331, a non-irradiated propylene homopolymer having an MFR of 12 dg/min. and an XI of 95 wt % and containing 0.066 pph of Irganox 1010, 0.06 pph Irganox 168 and 0.05 pph calcium stearate. The viscosity retention of the composition, as well as extrusion conditions and film properties, are summarized in Table 1.

TABLE 1

| | Ex. 1 | Comp. Ex. 2. | Ex. 3 | Ex. 4 |
|---|---|---|---|---|
| Die opening, mil | 25 | 25 | 25 | 25 |
| Viscosity Retention, % | 22 | 48 | 31 | 31 |
| Coating thickness, mil | 1 | 1 | 1 | 1 |
| Air Gap, inch | 6 | 6 | 7 | 7 |
| Die Temp., °F. | 590 | 590 | 590 | 590 |
| Roll type | Textured | Textured | Textured | Textured |
| Film appearance | Good | Fair | Good | Good |
| Max line speed, fpm | >1600 | <800 | 2000+ | 2000+ |

All incorporations by reference throughout this disclosure are done within the spirit and scope of the disclosure herein, and are not meant to limit the disclosure or scope of the following claims.

Additionally, the present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A composition comprising a blend of an irradiated first propylene polymer comprising a non-phenolic stabilizer and a non-irradiated second propylene polymer,
    wherein the irradiation of the first propylene polymer was conducted in the presence of an environment containing more than 0% and less than 15% by volume of oxygen,
    wherein the total amount of any phenolic stabilizers present in the first propylene polymer is at most 500 ppm, based upon the first propylene polymer,
    wherein the irradiated first propylene polymer and the non-irradiated second propylene polymer were blended at a temperature below the melting point of the first and second propylene polymers, and
    wherein the blend has a viscosity retention of 20 to 35%.

2. The composition of claim 1 wherein the first propylene polymer is selected from:
    (a) a crystalline propylene homopolymer having a xylene insolubles greater than 80%,
    (b) a crystalline random copolymer comprising propylene and an olefin selected from the group consisting of ethylene and a $C_4$-$C_{10}$ α-olefin, having xylene insolubles greater than 80%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
    (c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight, and
    (d) mixtures thereof.

3. The composition of claim 1 wherein the second propylene polymer is selected from crystalline propylene homopolymers, crystalline random copolymers comprising propylene and an olefin selected from ethylene, $C_4$-$C_{10}$ α-olefins or mixtures thereof.

4. The composition of claim 1 wherein the non-phenolic stabilizer is selected from hindered amines, hydroxylamines, phosphites or mixtures thereof.

5. The composition of claim 1 wherein the first propylene polymer is an extrudate.

* * * * *